US012725297B2

(12) United States Patent
Mizukoshi et al.

(10) Patent No.: US 12,725,297 B2
(45) Date of Patent: Sep. 1, 2026

(54) VIDEO GENERATION DEVICE, VIDEO GENERATION METHOD, AND PROGRAM

(71) Applicant: NTT DOCOMO, INC., Tokyo (JP)

(72) Inventors: Yuuichi Mizukoshi, Chiyoda-ku (JP); Kensuke Ueda, Chiyoda-ku (JP); Nobutaka Matsushima, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 269 days.

(21) Appl. No.: 18/691,226

(22) PCT Filed: Oct. 7, 2022

(86) PCT No.: PCT/JP2022/037691

§ 371 (c)(1),
(2) Date: Mar. 12, 2024

(87) PCT Pub. No.: WO2023/084965

PCT Pub. Date: May 19, 2023

(65) Prior Publication Data

US 2024/0378746 A1 Nov. 14, 2024

(30) Foreign Application Priority Data

Nov. 10, 2021 (JP) ................................ 2021-183190

(51) Int. Cl.
*G06T 7/73* (2017.01)

(52) U.S. Cl.
CPC ..................................... *G06T 7/73* (2017.01)

(58) Field of Classification Search
None
See application file for complete search history.

(56) References Cited

U.S. PATENT DOCUMENTS

2018/0324229 A1* 11/2018 Ross ..................... G06F 3/1423
2022/0030179 A1* 1/2022 Kundu .................... G06T 7/194
(Continued)

FOREIGN PATENT DOCUMENTS

WO WO 2020/240821 A1 12/2020

OTHER PUBLICATIONS

International Search Report Issued Dec. 20, 2022, in PCT/JP2022/037691, filed on Oct. 7, 2022, 2 pages.

*Primary Examiner* — Idowu O Osifade
(74) *Attorney, Agent, or Firm* — Oblon, McClelland, Maier & Neustadt, L.L.P.

(57) ABSTRACT

To provide a video generation device or the like which generates a video allowing an acquirer to obtain an ideal posture of a presenter from any viewpoint in real-time without fixing a self-position, while at the same time, allowing confirmation of a self-posture. The presenter wearing a wearable device including a camera $C_P$ and the acquirer wearing a wearable device including a camera $C_L$ and a transparent display face each other and capture images of each other with each other's cameras, and the video generation device comprises: a corresponding point obtaining part which estimates a frame of the acquirer from a video obtained with the camera $C_P$, obtains a set $F_L$ of one or more corresponding points representing the frame of the acquirer which is estimated, estimates a frame of the presenter from a video obtained with the camera $C_L$, and obtains a set $F_P$ of one or more corresponding points representing the frame of the presenter which is estimated; and a video generation part which generates, based on the set $F_L$ and the set $F_P$, a semi-transparent video representing a posture of the acquirer such that the semi-transparent video matches a posture of the presenter which is transparently seen through the display.

7 Claims, 9 Drawing Sheets

(56) References Cited

U.S. PATENT DOCUMENTS

| | | | | |
|---|---|---|---|---|
| 2022/0219043 | A1 | 7/2022 | Ueda et al. | |
| 2023/0116190 | A1* | 4/2023 | Kies | G06F 3/04815 715/236 |
| 2024/0320931 | A1* | 9/2024 | El Essaili | G06T 19/20 |

* cited by examiner

P

IDEAL POSTURE OF PRESENTER P (REAL BODY)

+(OVERLAP)

SEMI-TRANSPARENT VIDEO SHOWING SELF-POSTURE OF ACQUIRER L

VIEWPOINT OF ACQUIRER L WHEN USING GENERATION METHOD 1

P

IDEAL POSTURE OF PRESENTER P (REAL BODY)

+(OVERLAP)

SEMI-TRANSPARENT VIDEO SHOWING SELF-POSTURE OF ACQUIRER L

VIEWPOINT OF ACQUIRER L WHEN USING GENERATION METHOD 2

VIDEO GENERATION DEVICE, VIDEO GENERATION METHOD, AND PROGRAM

TECHNICAL FIELD

The present invention relates to a video generation device, a video generation method, and a program for generating a video which visually gives feedback on a movement of an acquirer.

BACKGROUND ART

By viewing and imitating an ideal posture of an expert, a beginner acquires a posture in sport, manufacturing, or the like based on advice of the expert and the like. For example, targets of acquisition are postures in dance choreography, bat swing, welding work, and the like. Hereinafter, a person who intends to acquire an ideal posture, for example, a beginner will be referred to as an acquirer, and a person who presents the ideal posture, for example, a teacher or an expert will be referred to as a presenter.

However, since a self-posture cannot be confirmed or it cannot be recognized which posture of the presenter is the ideal posture, even if there is a difference between the self-posture and the ideal posture, it is difficult for the acquirer to be aware of such a difference.

In addition, since the ideal posture varies depending on conditions, it is required that the ideal posture of the presenter is recognized and conveyed to the acquirer in real-time. For example, the ideal posture changes depending on conditions such as music of dance, a position of a ball, an angle of an object to be welded, and the like.

As the conventional art for confirming a self-posture, Patent Literature 1 has been known. In Patent Literature 1, feedback on a movement of an acquirer is visually made.

PRIOR ART LITERATURE

Patent Literature

Patent literature 1: International Publication No. WO 2020/240821

SUMMARY OF THE INVENTION

Problems to be Solved by the Invention

However, there is a problem in that although the conventional art teaches a movement of a self-posture, the conventional art does not directly teach a movement of a presenter in real-time.

Thus, a method as follows can be conceived.

Postures of the acquirer and the presenter are recorded with a fixed-point camera, and a self-posture and an ideal posture of the acquirer are overlappingly displayed on a display. The acquirer looks at the self-posture and the ideal posture for comparison, and receives advice from the presenter or the like. The acquirer acquires the posture by repeating work while being aware of a portion that should be corrected. However, when there are multiple complicated portions that should be corrected, the acquirer cannot memorize them and the number of times of failure will increase, resulting in a decrease in efficiency.

In addition, since a viewpoint is fixed in obtainment of a video using the fixed-point camera, it is not possible to look at a video from another viewpoint. Furthermore, an action involving a big movement may fall outside an angle of view.

These problems may be dealt with by setting a plurality of cameras. However, in this case, the configuration becomes complicated, and the cost becomes large. In addition, it may not be possible to set a plurality of cameras depending on the setting of the angle of view and external environment.

Furthermore, when the acquirer confirms the posture in real-time by using the display while performing a desired action, the position of the acquirer himself/herself is fixed to a position where the acquirer can look at the display. For this problem, when a big action or movement such as dance is involved, a conceivable configuration may be to move the display in accordance with the movement of the acquirer. However, the configuration becomes complicated, and the cost becomes large.

An object of the present invention is to provide a video generation device, a video generation method, and a program for generating a video which allows an acquirer to obtain an ideal posture of a presenter from any viewpoint in real-time without fixing a self-position, while at the same time, allows the acquirer to confirm a self-posture.

Means to Solve the Problems

To solve the above-described problem, one aspect of the present invention is a video generation device comprising: wherein a presenter wearing a wearable device including a camera $C_P$ and an acquirer wearing a wearable device including a camera $C_L$ and a transparent display face each other and capture images of each other with each other's cameras, a corresponding point obtaining part which estimates a frame of the acquirer from a video obtained with the camera $C_P$, obtains a set $F_L$ of one or more corresponding points representing the frame of the acquirer which is estimated, estimates a frame of the presenter from a video obtained with the camera $C_L$, and obtains a set $F_P$ of one or more corresponding points representing the frame of the presenter which is estimated; and a video generation part which generates, based on the set $F_L$ and the set $F_P$, a semi-transparent video representing a posture of the acquirer such that the semi-transparent video matches a posture of the presenter which is transparently seen through the transparent display.

Effects of the Invention

According to the present invention, an effect that an acquirer can obtain an ideal posture of a presenter from any viewpoint in real-time without fixing a self-position, while at the same time, can confirm a self-posture, is exerted.

DETAILED DESCRIPTION OF THE EMBODIMENTS

Figure 1:
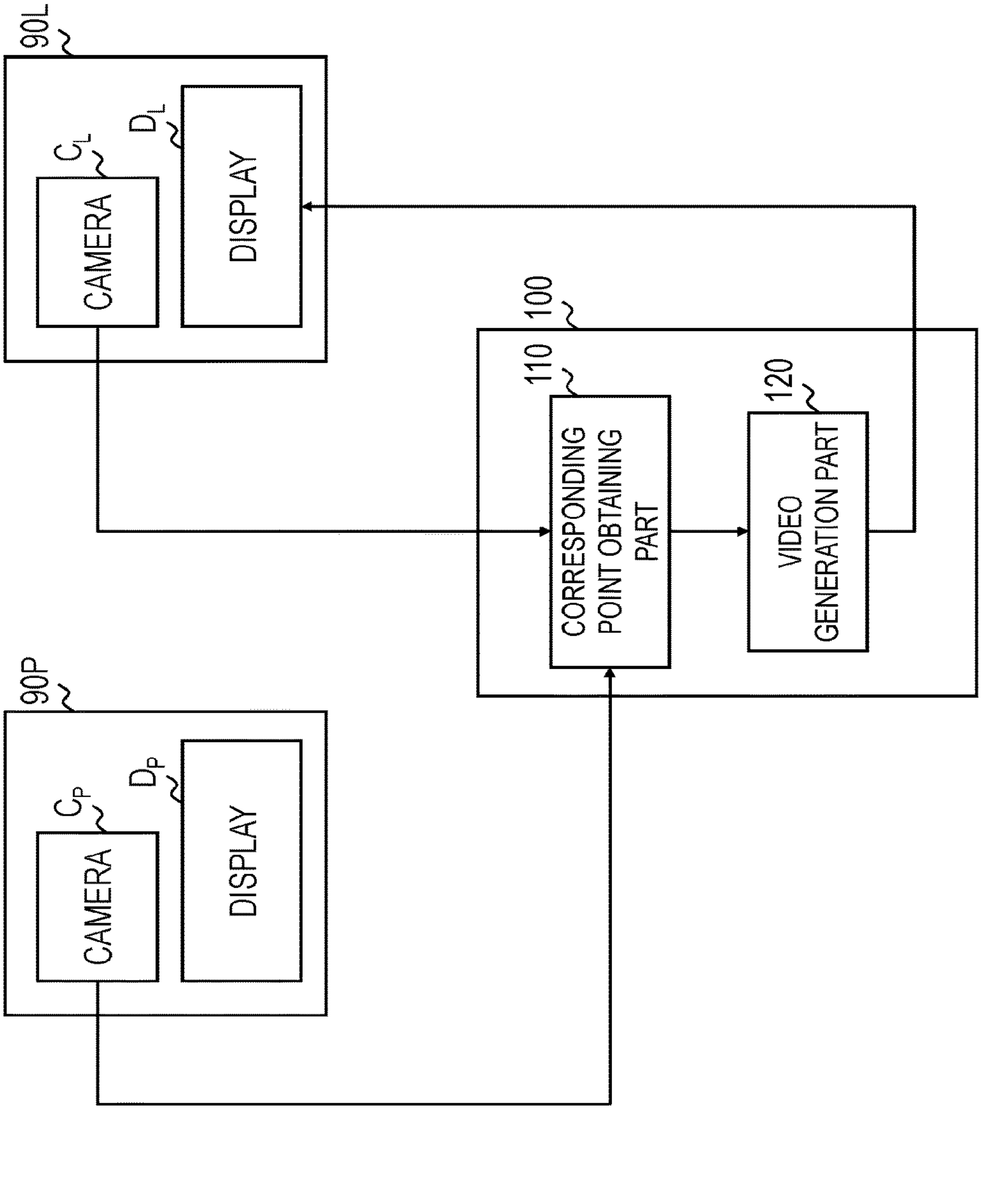
FIG. 1 is a functional block diagram of a teaching system according to a first embodiment.

Hereinafter, embodiments of the present invention will be described. It should be noted that, in the drawings used for the following descriptions, configuration parts having the same function or steps performing the same processing are denoted by the same reference numeral, and overlapping descriptions are omitted.

First Embodiment

Figure 2:
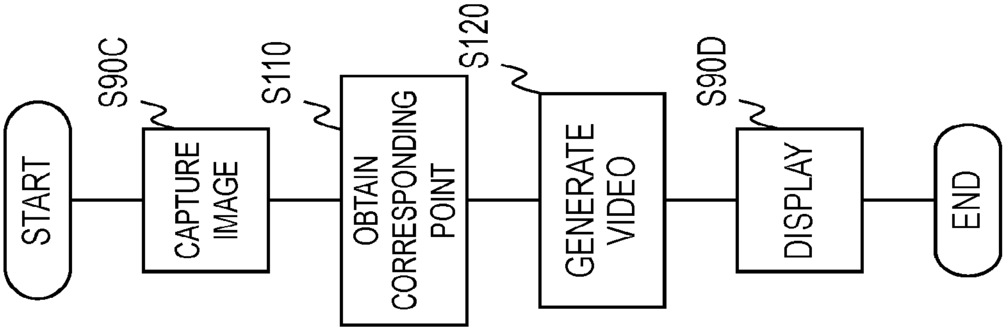
FIG. 2 is a diagram illustrating an example of a processing flow of the teaching system according to the first embodiment.

FIG. 1 illustrates a functional block diagram of a teaching system according to a first embodiment, and FIG. 2 illustrates a processing flow thereof.

The teaching system includes two wearable devices 90P, 90L and a video generation device 100. The two wearable devices 90P, 90L can perform wired or radio communication with the video generation device 100.

The two wearable devices 90P, 90L include a camera and a transparent display, and are made of XR glass, for example. XR (Cross Reality) is a technology encompassing "VR (Virtual Reality)", "AR (Augmented Reality)", "MR (Mixed Reality)".

Figure 3:
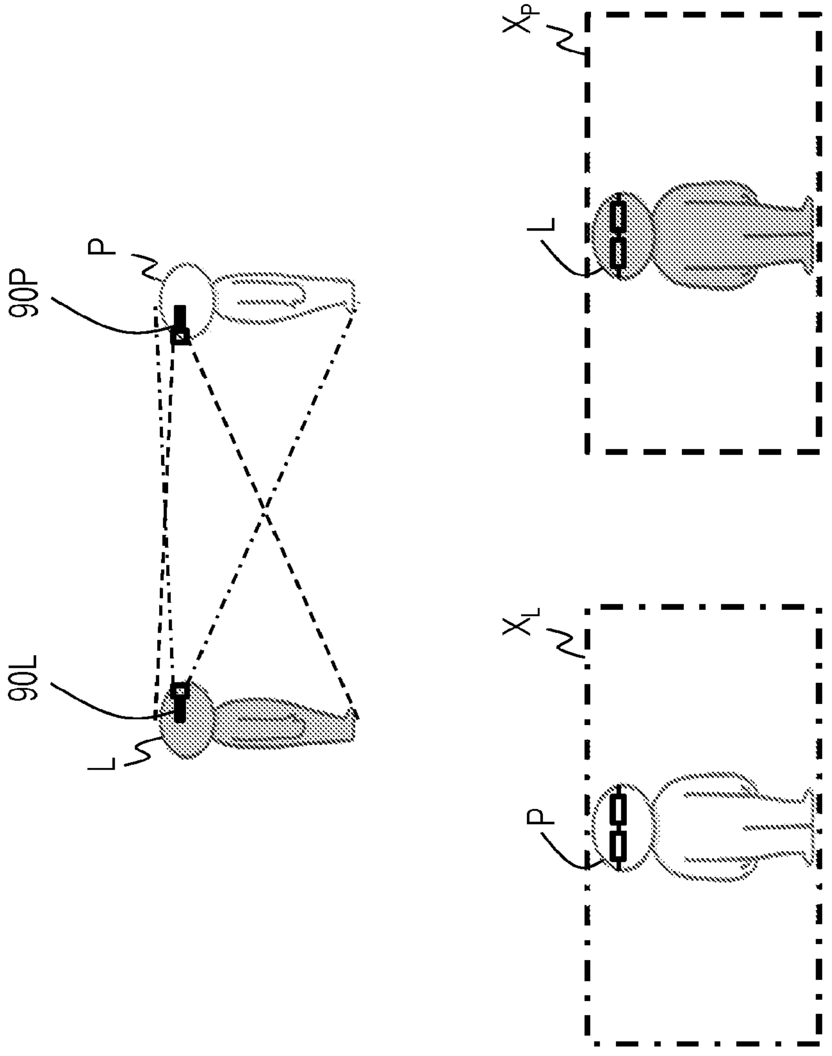
FIG. 3 is a diagram for describing an image capturing state and a video.

As illustrated in FIG. 3, a presenter P wears the wearable device 90P including a camera $C_P$ and a transparent display $D_P$, and an acquirer L wears the wearable device 90L including a camera $C_L$, and a transparent display $D_L$. The presenter P and the acquirer L face each other, and capture images of each other with each other's cameras. A video $X_L$, in FIG. 3 is an example of a video that can be obtained by capturing an image with the camera $C_L$, of the acquirer L, and a video $X_P$ is an example of a video that can be obtained by capturing an image with the camera $C_P$ of the presenter P.

The video generation device 100 comprises a corresponding point obtaining part 110 and a video generation part 120.

The video generation device 100 uses the video $X_P$ obtained with the camera $C_P$ and the video $X_L$ obtained with the camera $C_L$ as input to generate a semi-transparent video representing a posture of the acquirer L, and outputs the semi-transparent video to the display $D_L$. The semi-transparent video is a video copying the body of the acquirer L made of, for example, 3DCG (3-Dimensional Computer Graphics).

The acquirer L can visually recognize an ideal posture of the presenter P via the transparent display $D_L$, and confirm a video representing a self-posture displayed on the display $D_L$.

Hereinafter, descriptions will be made concerning each part.

<Camera $C_P$, $C_L$>

The camera $C_P$ worn by the presenter P captures an image of the acquirer L (S90C), and outputs the video $X_P$. On the other hand, the camera $C_L$, worn by the acquirer L captures an image of the presenter P (S90C), and outputs the video $X_L$.

<Corresponding Point Obtaining Part 110>

The corresponding point obtaining part 110 uses the video $X_P$ and the video $X_L$ as input to estimate a frame of the presenter P from the video $X_L$, obtain a set $F_P$ of one or more corresponding points representing the frame of the presenter P which is estimated, estimate a frame of the acquirer L from the video $X_P$, and obtain a set $F_L$ of one or more corresponding points representing the frame of the acquirer L which is estimated (S110), and performs output. Two obtainment methods of the sets $F_L$, $F_P$ will be presented in the following.

(Obtainment Method 1)

The corresponding point obtaining part 110 uses the conventional art to estimate the frame of the presenter P from the video $X_L$, and estimate the frame of the acquirer L from the video $X_P$. Various technologies can be conceived as the conventional art of frame estimation. This obtainment method uses a frame estimation method which can obtain an intersection point of a neck and a trunk, and an intersection point of the trunk and legs. For example, a method of Reference Literature 1 can be conceived.

(REFERENCE LITERATURE 1) "Vision Pose", [online], [searched on Nov. 2, 2021], the Internet URL: https://www.next-system.com/blog/2021/02/12/post-3763/.

Figure 4:
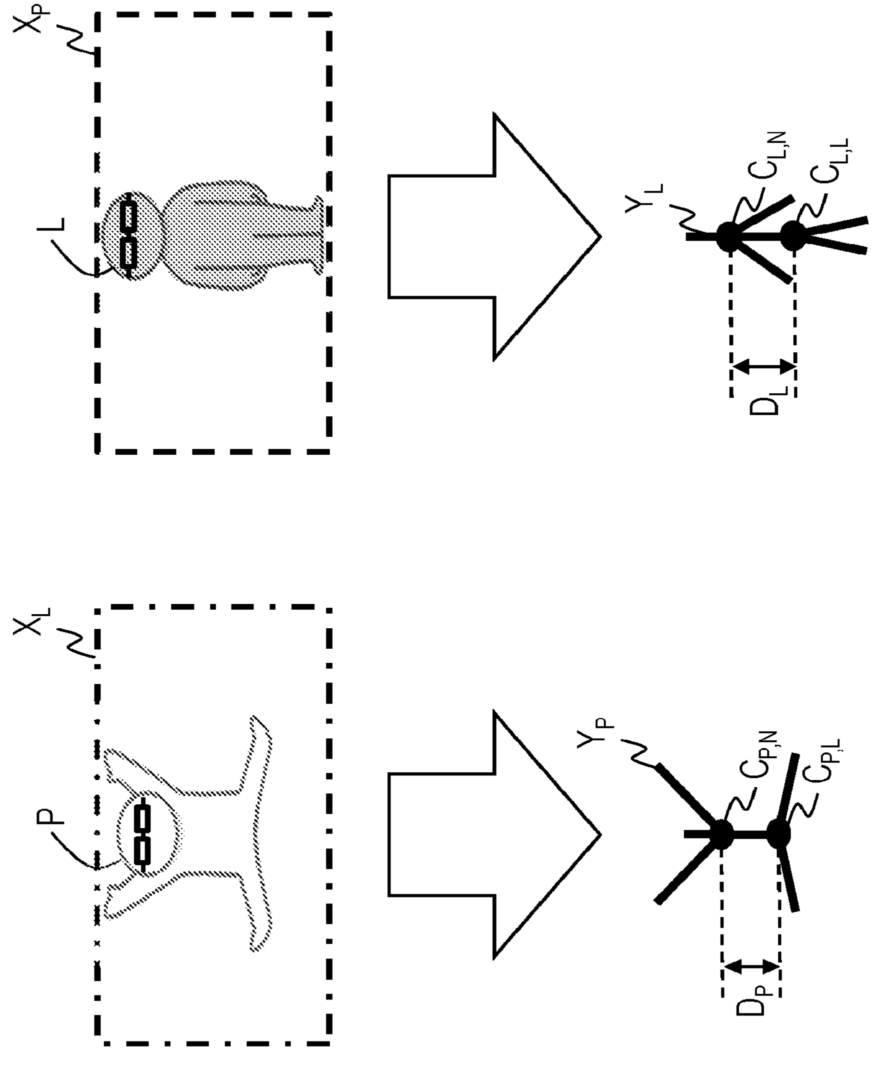
FIG. 4 is a diagram for describing frame estimation of obtainment method 1.

The corresponding point obtaining part 110 obtains the sets $F_L$, $F_P$ including corresponding points consisting of intersection points of the neck and the trunk and corresponding points consisting of intersection points of the trunk and the legs. For example, the corresponding point obtaining part 110 estimates the frame of the presenter P from the video $X_L$, in FIG. 4, and obtains the set $F_P$ including corresponding points $C_{P,N}$ consisting of the intersection points of the neck and the trunk and corresponding points $C_{P,L}$ consisting of the intersection points of the trunk and the legs from a frame estimation result $Y_P$. Further, the corresponding point obtaining part 110 estimates the frame of the acquirer L from the video $X_P$ in FIG. 4, and obtains the set $F_L$ including corresponding points $C_{L,N}$ consisting of the intersection points of the neck and the trunk and corresponding points $C_{L,L}$ consisting of the intersection points of the trunk and the legs from a frame estimation result $Y_L$.

(Obtainment Method 2)

The corresponding point obtaining part 110 uses the conventional art to estimate the frame of the presenter P from the video $X_L$, and estimate the frame of the acquirer L from the video $X_P$. Various technologies can be conceived as the conventional art of frame estimation. This obtainment method uses a frame estimation method which can obtain four corresponding points consisting of apexes of a plane surface having a quadrangle shape copying the trunk. For example, the method of Reference Literature 1 can be conceived.

Figure 5:
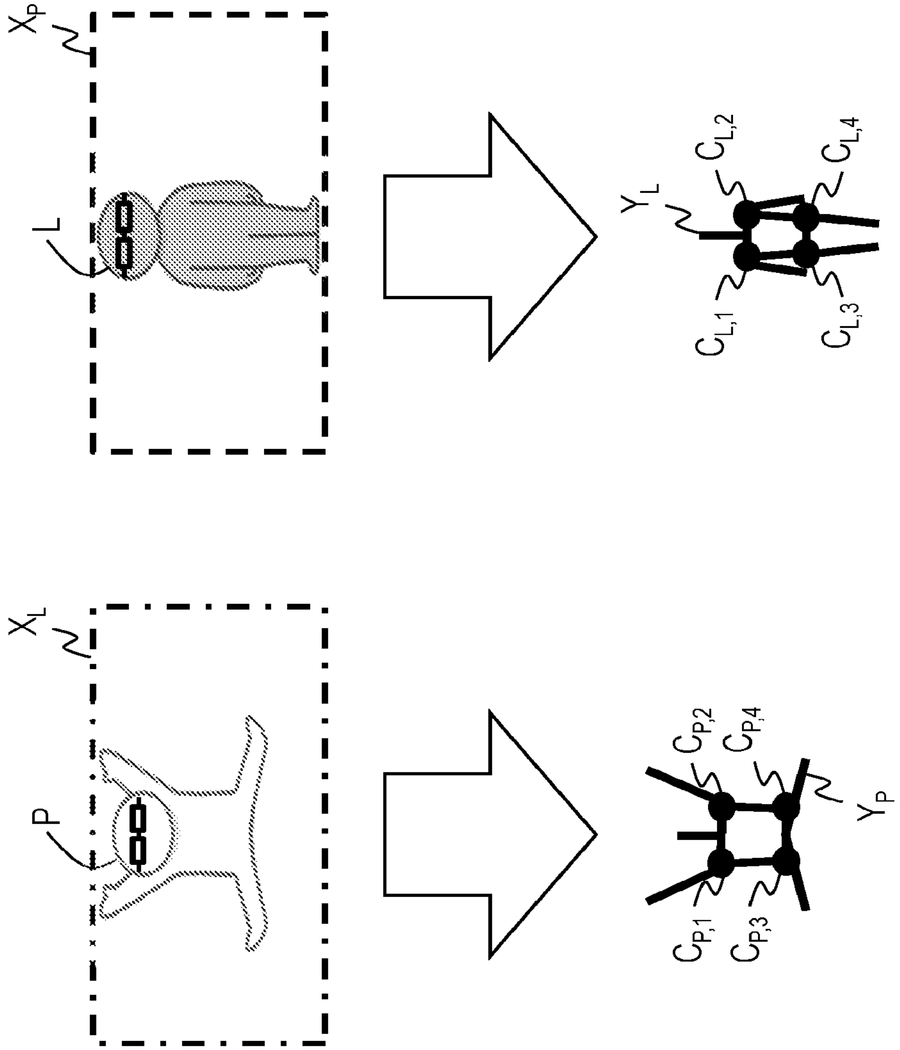
FIG. 5 is a diagram for describing frame estimation of obtainment method 2.

The corresponding point obtaining part 110 obtains the sets $F_L$, $F_P$ including the four corresponding points consisting of the apexes of the plane surface having the quadrangle shape copying the trunk. For example, the corresponding point obtaining part 110 estimates the frame of the presenter P from the video $X_L$ in FIG. 5, and obtains the set $F_P$ including corresponding points $C_{P,1}$, $C_{P,2}$, $C_{P,3}$, and $C_{P,4}$ indicating positions of the right shoulder, the left shoulder, the right buttock, and the left buttock, respectively, from the frame estimation result $Y_P$. Further, the corresponding point obtaining part 110 estimates the frame of the acquirer L from the video $X_P$ in FIG. 5, and obtains the set $F_L$ including corresponding points $C_{L,1}$, $C_{L,2}$, $C_{L,3}$, and $C_{L,4}$ indicating positions of the right shoulder, the left shoulder, the right buttock, and the left buttock, respectively, from the frame estimation result $Y_L$.

<Video Generation Part 120>

The video generation part 120 uses the set $F_L$ and the set $F_P$ as input, and based on the set $F_L$ and the set $F_P$, generates a semi-transparent video representing a posture of the acquirer L such that the semi-transparent video matches a posture of the presenter P which is transparently seen through the display (S120), and outputs the semi-transparent video. In other words, the video generation part 120 generates the semi-transparent video representing a posture of the acquirer L in a manner that the semi-transparent video matches a posture of the presenter P which is transparently seen through the display. Two generation methods corresponding to the two obtainment methods of the sets $F_L$, $F_P$ mentioned above will be presented.

(Generation Method 1 Corresponding to Obtainment Method 1)

Figure 6:
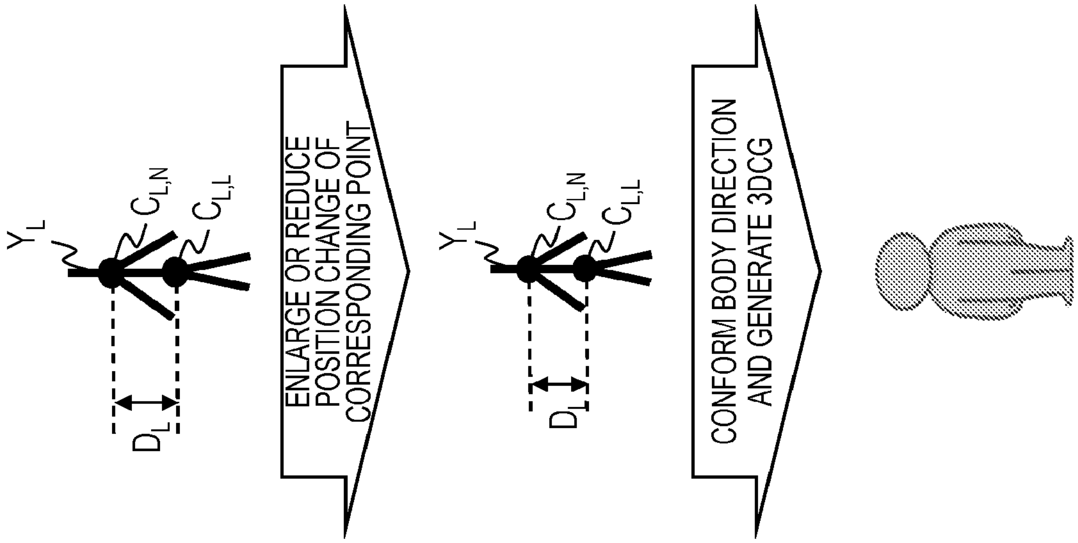
FIG. 6 is a diagram for describing generation method 1.

FIG. 6 is a diagram for describing generation method 1.

For example, the video generation part 120 calculates a distance $D_L$ between the corresponding points $C_{L,N}$ consisting of the intersection points of the neck and the trunk and the corresponding points $C_{L,L}$ consisting of the intersection points of the trunk and the legs included in the set $F_L$, and calculates a distance $D_P$ between the corresponding points $C_{P,N}$ consisting of the intersection points of the neck and the trunk and the corresponding points $C_{P,L}$ consisting of the intersection points of the trunk and the legs included in the set $F_P$. The video generation part 120 enlarges or reduces the distance $D_L$ such that the distance $D_L$ matches the distance $D_P$. In other words, the video generation part 120 enlarges or reduces the distance $D_L$ in a manner that the distance $D_L$ matches the distance $D_P$. The video generation part 120 enlarges or reduces the frame estimation result of the acquirer L obtained with the corresponding point obtaining part 110 in conformity to (with the same magnification as) the enlargement or the reduction of the distance $D_L$.

Furthermore, the video generation part 120 changes positions of the corresponding points $C_{L,N}$ and the corresponding points $C_{L,L}$ such that the corresponding points $C_{L,N}$ consisting of the intersection points of the neck and the trunk in the enlarged or reduced distance $D_L$ match the corresponding points $C_{P,N}$ consisting of the intersection points of the neck and the trunk included in the set $F_P$, and the corresponding points $C_{L,L}$ consisting of the intersection points of the trunk and the legs in the enlarged or reduced distance $D_L$ match the corresponding points $C_{P,L}$ consisting of the intersection points of the trunk and the legs included in the set $F_P$. In other words, the video generation part 120 changes positions of the corresponding points $C_{L,N}$ and the corresponding points $C_{L,L}$ in a manner that the corresponding points $C_{L,N}$ match the corresponding points $C_{P,N}$ and the corresponding points $C_{L,L}$ match the corresponding points $C_{P,L}$. The video generation part 120 conforms the enlarged or reduced frame estimation result mentioned above to the corresponding points $C_{L,N}$ and the corresponding points $C_{L,L}$ in the changed positions, and further conforms the enlarged or reduced frame estimation result of the acquirer L to the direction of the body of the presenter P, thereby generating the semi-transparent video representing the posture of the acquirer L based on the enlarged or reduced frame estimation result of the acquirer L having the conformed position and direction.

That is to say, the video generation part 120 generates the semi-transparent video representing the posture of the acquirer L that satisfying the following three conditions.

The semi-transparent video representing the posture of the acquirer L corresponds to the frame estimation result of the acquirer L that is enlarged or reduced in conformity to the enlarged or reduced distance $D_L$.

The corresponding points $C_{L,N}$ in the semi-transparent video representing the posture of the acquirer L match the corresponding points $C_{P,N}$ of the presenter P, and the corresponding points $C_{L,L}$ in the semi-transparent video representing the posture of the acquirer L match the corresponding points $C_{P,L}$ of the presenter P.

The direction of the body in the semi-transparent video representing the posture of the acquirer L matches the direction of the body of the presenter P.

By achieving such a configuration, gaps between the acquirer L and the presenter P due to differences in the frames are corrected, and gaps between the positions and the directions of the bodies of the acquirer L and the presenter P are corrected.

(Generation Method 2 Corresponding to Obtainment Method 2)

Figure 7:
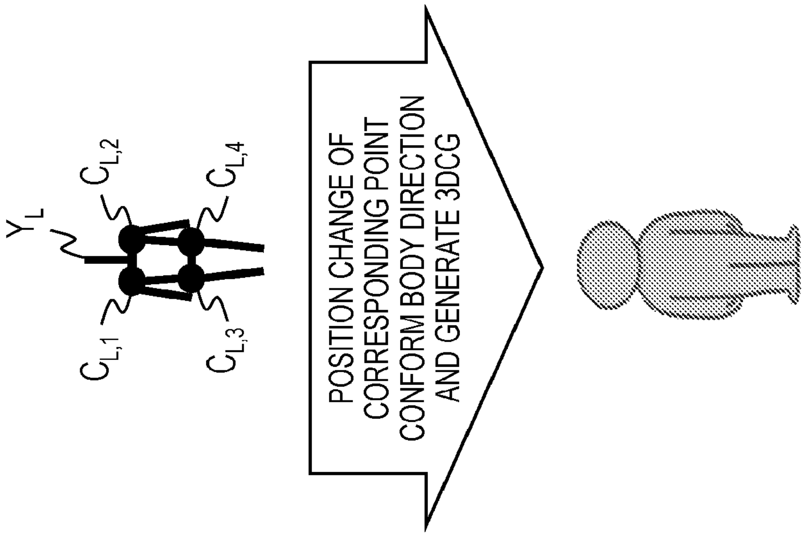
FIG. 7 is a diagram for describing generation method 2.

FIG. 7 is a diagram for describing generation method 2.

The video generation part 120 generates the semi-transparent video representing the posture of the acquirer L such that a plane surface formed of a quadrangle shape having the four corresponding points $C_{L,1}$, $C_{L,2}$, $C_{L,3}$, and $C_{L,4}$ included in the set $F_L$ as its apexes matches a plane surface formed of a quadrangle shape having the four corresponding points $C_{P,1}$, $C_{P,2}$, $C_{P,3}$, and $C_{P,4}$ included in the set $F_P$ as its apexes. In other words, the video generation part 120 generates the semi-transparent video representing the posture of the acquirer L in a manner that a plane surface formed of a quadrangle shape having the four corresponding points $C_{L,1}$, $C_{L,2}$, $C_{L,3}$, and $C_{L,4}$ as its apexes matches a plane surface formed of a quadrangle shape having the four corresponding points $C_{P,1}$, $C_{P,2}$, $C_{P,3}$, and $C_{P,4}$ included in the set $F_P$ as its apexes.

For example, the video generation part 120 obtains a normal vector of the plane surface formed of the quadrangle shape having the corresponding points $C_{L,1}$, $C_{L,2}$, $C_{L,3}$, and $C_{L,4}$ as its apexes, and a normal vector of the plane surface formed of the quadrangle shape having the corresponding points $C_{P,1}$, $C_{P,2}$, $C_{P,3}$, and $C_{P,4}$ as its apexes. The video generation part 120 rotates the plane surface formed of t he quadrangle shape having the corresponding points $C_{L,1}$, $C_{L,2}$, $C_{L,3}$, and $C_{L,4}$ as its apexes such that the normal vectors match each other, and obtains apexes $C'_{L,1}$, $C'_{L,2}$, $C'_{L,3}$, and $C'_{L,4}$ of the rotated plane surface formed of the quadrangle shape. In other words, the video generation part 120 rotates the plane surface formed of the quadrangle shape having the corresponding points $C_{L,1}$, $C_{L,2}$, $C_{L,3}$, and $C_{L,4}$ as its apexes in a manner that the two normal vectors match each other, and obtains the apexes $C'_{L,1}$, $C'_{L,2}$, $C'_{L,3}$, and $C'_{L,4}$ of the rotated plane surface formed of the quadrangle shape. Furthermore, the video generation part 120 moves the rotated plane surface formed of the quadrangle shape in parallel such that the rotated plane surface formed of the quadrangle shape matches the plane surface formed of the quadrangle shape having the four corresponding points $C_{P,1}$, $C_{P,2}$, $C_{P,3}$, and $C_{P,4}$ as its apexes, and obtains apexes $C''_{L,1}$, $C''_{L,2}$, $C''_{L,3}$, and $C''_{L,4}$ of the plane surface formed of the quadrangle shape moved in parallel. In other words, the video generation part 120 moves the rotated plane surface formed of the quadrangle shape in parallel in a manner that the rotated plane surface formed of the quadrangle shape matches the plane surface formed of the quadrangle shape having the four corresponding points $C_{P,1}$, $C_{P,2}$, $C_{P,3}$, and $C_{P,4}$ as its apexes, and obtains apexes $C''_{L,1}$, $C''_{L,2}$, $C''_{L,3}$, and $C''_{L,4}$ of the plane surface formed of the quadrangle shape moved in parallel. It should be noted that the state where "the two plane surfaces formed of the quadrangle shapes match each other" refers to, for example, a state where an overlapping portion of the two plane surfaces formed of the quadrangle shapes becomes large as much as possible, and/or a state where the centers of gravity of the two quadrangle shapes match each other. It should be noted that the expression "A and/or B" includes "A and B" or "A or B".

The video generation part 120 conforms the apexes $C''_{L,1}$, $C''_{L,2}$, $C''_{L,3}$, and $C''_{L,4}$ in the changed positions to the frame estimation result obtained with corresponding point obtaining part 110 mentioned above, and further conforms the frame estimation result of the acquirer L to the direction of the body of the presenter P, thereby generating the semi-transparent video representing the posture of the acquirer L based on the frame estimation result of the acquirer L having the conformed position and direction.

<Display $D_L$>

A presentation system displays the semi-transparent video on the display $D_L$ of the acquirer L such that the self-posture can be recognized (S90D).

Figure 8:
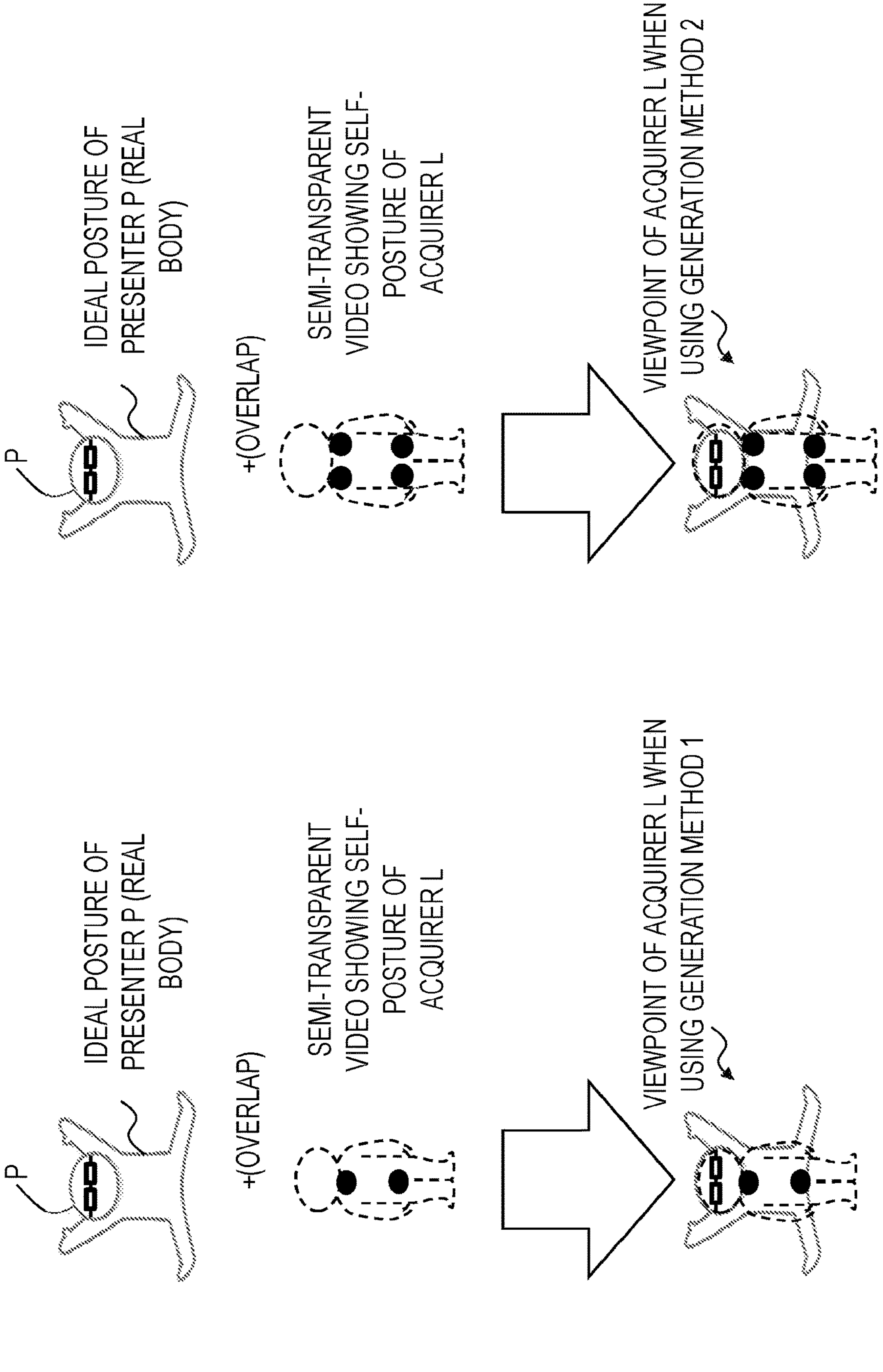
FIG. 8 is a diagram illustrating examples of a presenter seen from a viewpoint of an acquirer and an overlapped video.

FIG. 8 illustrates examples of the presenter P seen from a viewpoint of the acquirer L and an overlapped video. As mentioned above, the acquirer L can visually recognize the ideal posture of the presenter P via the transparent display $D_L$, and confirm a video representing the self-posture displayed on the display $D_L$.

<Effect>

With the configuration as above, an acquirer can obtain an ideal posture of a presenter from any viewpoint in real-time without fixing a self-position, while at the same time, can confirm a self-posture.

<Modification>

In the present embodiment, the wearable device 90P on the presenter P side includes the camera $C_P$ and the display $D_P$. However, the wearable device 90P does not necessarily have to include the display $D_P$ to exert the effect of the present embodiment.

In the present embodiment, the video generation device 100 is a separate device from the wearable devices 90P, 90L. However, the video generation device 100 may be mounted on either of the wearable devices 90P, 90L.

<Hardware Configuration>

It should be noted that the block diagrams used for the descriptions of the above-described embodiment show blocks in functional units. These functional blocks (configuration parts) are achieved by any combination of at least either of hardware or software. In addition, the achievement method of each functional block is not particularly limited. That is, each functional block may be achieved by using a single device that is physically or logically coupled, or may be achieved by directly or indirectly (for example, by wire, radio, and the like) connecting two or more devices that are physically or logically separated and using these multiple devices. The functional block may be achieved by combining software to the above-described single device or the above-described multiple devices.

The functions include obtainment, generation, calculation, processing, confirmation, reception, transmission, output, communication (communicating), configuration (configuring), and the like, but are not limited thereto. For example, the functional block (configuration part) achieving the function of transmission is called a transmission part (transmitting unit) or transmitter. In any case, as mentioned above, the achievement method is not particularly limited.

Figure 9:
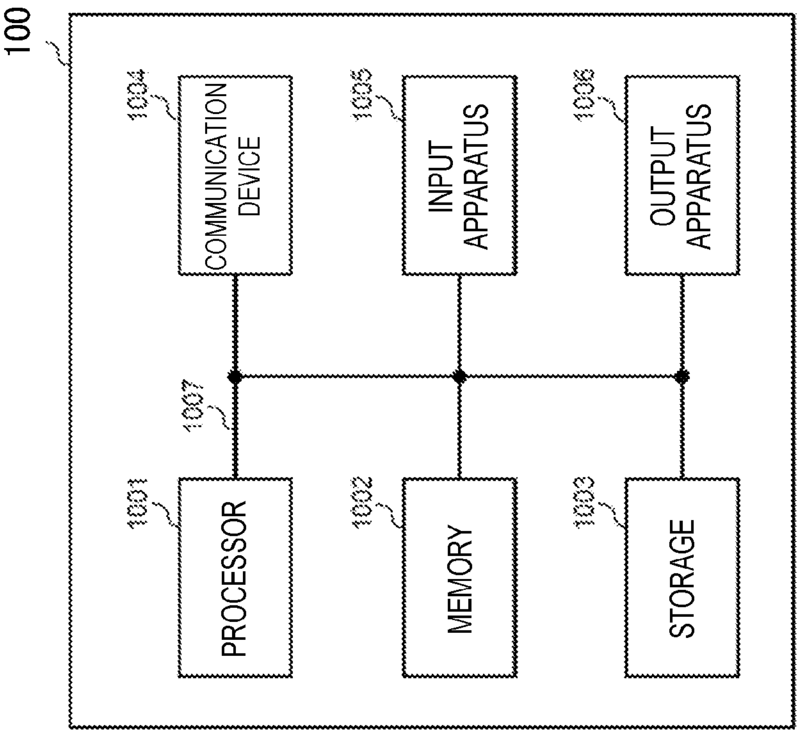
FIG. 9 is a diagram illustrating an example of a hardware configuration of a video generation device.

FIG. 9 is a diagram illustrating an example of a hardware configuration of the device according to an embodiment of the present disclosure. The video generation device 100 mentioned above may be physically formed as a computer device including a processor 1001, a memory 1002, a storage 1003, a communication device 1004, an input apparatus 1005, an output apparatus 1006, a bus 1007, and the like.

It should be noted that, in the following descriptions, the term "device" can be replaced with a circuit, apparatus, unit, or the like. The hardware configuration of the video generation device 100 may be formed so as to include one or more of each device illustrated in the diagram, or may be formed without including some devices.

Each function in the video generation device 100 is achieved by allowing hardware such as the processor 1001 or the memory 1002 to read predetermined software (program), and the processor 1001 to perform arithmetic operations, thereby controlling communication by the communication device 1004, controlling at least either of reading and writing of data in the memory 1002 and the storage 1003, etc.

The processor 1001 controls the entire computer by, for example, operating an operating system. The processor 1001 may be formed of a Central Processing Unit (CPU) including an interface with a peripheral device, a control device, an arithmetic operation device, a register, and the like. For example, the corresponding point obtaining part 110, the video generation part 120, and the like mentioned above may be achieved by the processor 1001.

In addition, the processor 1001 reads a program (program code), a software module, data, and the like from at least either of the storage 1003 and the communication device 1004 to the memory 1002, and accordingly executes various processings. As the program, a program for causing a computer to execute at least some of the actions described in the embodiment mentioned above is used. For example, the corresponding point obtaining part 110 may be stored on the memory 1002 and achieved by a control program operated in the processor 1001, and other functional blocks may be similarly achieved. It has been described that various processings mentioned above are executed by the single processor 1001, but the processings may be simultaneously or sequentially executed by two or more processors 1001. The processor 1001 may be implemented by one or more chips. It should be noted that the program may be transmitted from a network via an electric telecommunication line.

The memory 1002 is a computer-readable recording medium, and may be formed of at least one of, for example, a Read Only Memory (ROM), an Erasable Programmable ROM (EPROM), an Electrically Erasable Programmable ROM (EEPROM), a Random Access Memory (RAM), and the like. The memory 1002 may also be called a register, a cache, a main memory (main storage device), or the like. The memory 1002 can store a program (program code), a software module, or the like executable for conducting a radio communication method according to an embodiment of the present disclosure.

The storage 1003 is a computer-readable recording medium, and may be formed of at least one of, for example, an optical disk such as a Compact Disc ROM (CD-ROM), a hard disk drive, a flexible disk, a magneto-optical disk (for example, a compact disc, a digital versatile disc, or a Blu-ray (registered trademark) disc), a smart card, a flash memory (for example, a card, a stick, or a key drive), a floppy (registered trademark) disk, a magnetic strip, and the like. The storage 1003 may also be called an auxiliary storage device. The storage medium mentioned above may be, for example, a database, a server, or other appropriate mediums including at least either of the memory 1002 and the storage 1003.

The communication device 1004 is hardware (a transmission/reception device) for performing communication between computers via at least either of a wired network and a radio network, and is also called, for example, a network device, a network controller, a network card, a communication module, or the like. The communication device 1004 may also be formed by including a high frequency switch, a duplexer, a filter, a frequency synthesizer, or the like to achieve, for example, at least either of Frequency Division Duplex (FDD) and Time Division Duplex (TDD).

The input apparatus 1005 is an input device (for example, a keyboard, a mouse, a microphone, a switch, a button, a sensor, or the like) which accepts input from the outside. The output apparatus 1006 is an output device (for example, a display, a speaker, an LED lamp, or the like) which conducts output to the outside. It should be noted that the input apparatus 1005 and the output apparatus 1006 may be integrally formed (for example, a touch panel).

In addition, each device such as the processor 1001 or the memory 1002 is connected to each other by the bus 1007 for communicating information. The bus 1007 may be formed by using a single bus, or may be formed by using different buses among devices.

In addition, the video generation device 100 may be formed by including hardware such as a microprocessor, a Digital Signal Processor (DSP), an Application Specific Integrated Circuit (ASIC), a Programmable Logic Device (PLD), or a Field Programmable Gate Array (FPGA), and some or all of each functional block may be achieved by this hardware. For example, the processor 1001 may be implemented by using at least one of these kinds of hardware.

<Program and Recording Medium>

A program in which various processing contents mentioned above are written may be recorded on a computer-readable recording medium. The computer-readable recording medium may be any kind, for example, a magnetic recording device, an optical disk, a magneto-optical recording medium, a semiconductor memory, or the like.

In addition, this program is distributed by, for example, selling, transferring, lending, etc. of a portable recording medium such as a DVD or CD-ROM on which this program is recorded. Furthermore, this program may be distributed by storing this program on a storage device of a server computer, and transferring this program to other computers from the server computer via a network.

Firstly, for example, a computer which executes such a program once stores, on its storage device, the program recorded on the portable recording medium or the program transferred from the server computer. At the time of execution of a processing, this computer reads the program stored on its recording medium, and executes the processing according to the read program. In addition, as another aspect of execution of this program, the computer may read the program directly from the portable recording medium and execute the processing according to the program, or every time the program is transferred from the server computer to this computer, the processing according to the received program may be sequentially executed. Furthermore, the processings mentioned above may be executed by so-called Application Service Provider (ASP) type service which achieves a processing function with only an execution instruction and result obtainment, without transfer of the program from the server computer to this computer. It should be noted that the program in this aspect includes information provided for a processing by a computing device, which is equivalent to the program (not a direct command to the computer, but data or the like having a property of defining a processing of the computer).

In addition, in this aspect, the present device is formed by executing a predetermined program on a computer, but at least some of these processing contents may be achieved by hardware.

<Other Modification>

The present invention is not limited to the above-described embodiment and its modification. For example, various processings mentioned above may not only be executed in time series according to the descriptions, but may be executed in parallel or individually depending on the processing capacity of the device which executes the processing or as necessary. Moreover, alterations can be appropriately made without departing from the scope of the present invention.

What is claimed is:

1. A video generation device comprising:

wherein a presenter wearing a wearable device including a camera $C_P$ and an acquirer wearing a wearable device including a camera $C_L$ and a transparent display face each other and capture images of each other with each other's cameras, processing circuitry configured to estimate a frame of the acquirer from a video obtained with the camera $C_P$, obtain a set $F_L$ of one or more corresponding points representing the frame of the acquirer which is estimated, estimate a frame of the presenter from a video obtained with the camera $C_L$, obtain a set $F_P$ of one or more corresponding points representing the frame of the presenter which is estimated, and generate, based on the set $F_L$ and the set $F_P$, a semi-transparent video representing a posture of the acquirer such that the semi-transparent video matches a posture of the presenter which is transparently seen through the transparent display.

2. The video generation device according to claim 1, wherein the set $F_L$ and the set $F_P$ include corresponding points consisting of intersection points of a neck and a trunk, and corresponding points consisting of intersection points of the trunk and legs, the processing circuitry enlarges or reduces a distance $D_L$ between the corresponding points consisting of the intersection points of the neck and the trunk and the corresponding points consisting of the intersection points of the trunk and the legs included in the set $F_L$ such that the distance $D_L$ matches a distance $D_P$ between the corresponding points consisting of the intersection points of the neck and the trunk and the corresponding points consisting of the intersection points of the trunk and the legs included in the set $F_P$, and generates the semi-transparent video representing the posture of the acquirer such that the corresponding points consisting of the intersection points of the neck and the trunk in the distance $D_L$ which is enlarged or reduced match the corresponding points consisting of the intersection points of the neck and the trunk included in the set $F_P$, and the corresponding points consisting of the intersection points of the trunk and the legs in the distance $D_L$ which is enlarged or reduced match the corresponding points consisting of the intersection points of the trunk and the legs included in the set $F_P$.

3. The video generation device according to claim 1, wherein the set $F_L$, and the set $F_P$ include four corresponding points consisting of apexes of a plane surface having a quadrangle shape copying the trunk, and the processing circuitry generates the semi-transparent video representing the posture of the acquirer such that the plane surface formed of the four corresponding points included in the set $F_L$ matches the plane surface formed of the four corresponding points included in the set $F_P$.

4. A video generation method for use in a video generation device, comprising:

a capturing step in which a presenter wearing a wearable device including a camera $C_P$ and an acquirer wearing a wearable device including a camera $C_L$ and a transparent display facing each other and capturing images of each other with each other's cameras;

a corresponding points obtaining step in which the video generation device estimates a frame of the acquirer from a video obtained with the camera $C_P$, obtains a set $F_L$ of one or more corresponding points representing the frame of the acquirer which is estimated, estimates a frame of the presenter from a video obtained with the camera $C_L$, and obtains a set $F_P$ of one or more corresponding points representing the frame of the presenter which is estimated;

a video generating step in which the video generation device generates, based on the set $F_L$ and the set $F_P$, a semi-transparent video representing a posture of the acquirer such that the semi-transparent video matches a posture of the presenter which is transparently seen through the transparent display; and a displaying step in which the semi-transparent video is displayed on the transparent display.

5. A non-transitory computer-readable recording medium on which a program for causing a computer to function as the video generation device according to claim 1.

6. A non-transitory computer-readable recording medium on which a program for causing a computer to function as the video generation device according to claim 2.

7. A non-transitory computer-readable recording medium on which a program for causing a computer to function as the video generation device according to claim 3.

* * * * *